(No Model.)

H. W. JONES.
WHIP SOCKET.

No. 462,559. Patented Nov. 3, 1891.

WITNESSES:
Ella L. Gerhart
Geo. A. Lane

INVENTOR
Harry Walter Jones,
BY Wm. R. Gerhart
ATTORNEY.

UNITED STATES PATENT OFFICE.

HARRY WALTER JONES, OF STEELVILLE, PENNSYLVANIA.

WHIP-SOCKET.

SPECIFICATION forming part of Letters Patent No. 462,559, dated November 3, 1891.

Application filed March 5, 1891. Serial No. 383,880. (No model.)

*To all whom it may concern:*

Be it known that I, HARRY WALTER JONES, a citizen of the United States, residing at Steelville, in the county of Chester and State of Pennsylvania, have invented certain Improvements in Whip-Sockets, of which the following is a specification.

This invention relates to improvements in that class of sockets attached to vehicles for holding whips; and it consists in the construction and combination of the various parts, as hereinafter fully described, and specifically pointed out in the claims.

Figure 1:
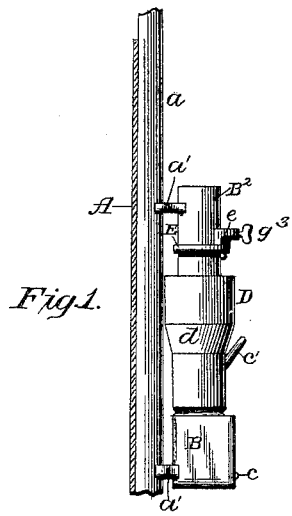
Figure 3:
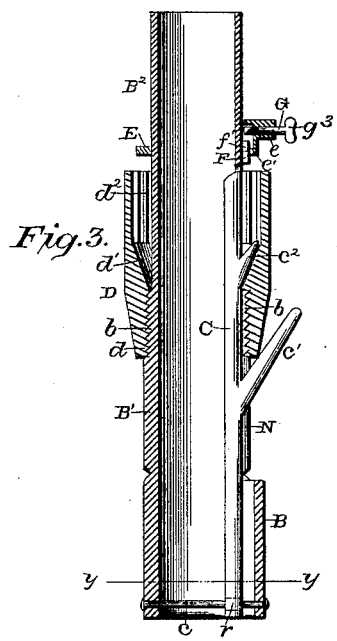
Figure 2:
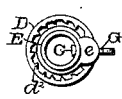
Figure 5:
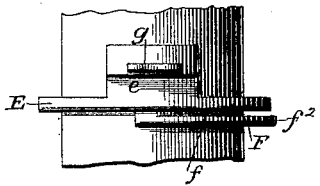
Figure 6:
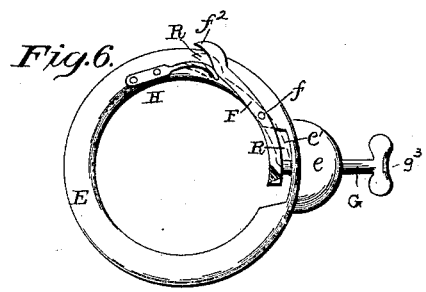
Figure 7:
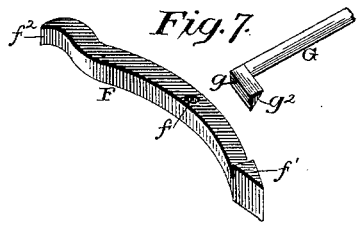
Figure 8:
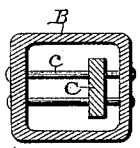

In the accompanying drawings, which form a part of this specification, Figure 1 is a side elevation of one of my whip-sockets shown attached to one of the posts of a vehicle. Fig. 2 is a top or plan view of the same, shown detached from the post. Fig. 3 is a vertical central section of my device, showing the parts in position for the whip to be inserted in the socket; and Fig. 4 a similar view showing a whip held in the socket. Fig. 5 is a front elevation of a portion of the upper end of the socket, showing the device for holding the sleeve in an elevated position. Fig. 6 is a bottom plan view of the collar and pawl. Fig. 7 is a perspective view of the pawl and the device for actuating it in one direction; and Fig. 8 is a horizontal section on the line $y\ y$, Fig. 3.

Similar letters indicate like parts throughout the several views.

Referring to the details of the drawings, A indicates the dash-board of a vehicle; $a$, a post to which the socket is attached, and $a'$ blocks holding the socket out from the post, through which pass screws or bolts, securing the socket thereto.

Figure 4:
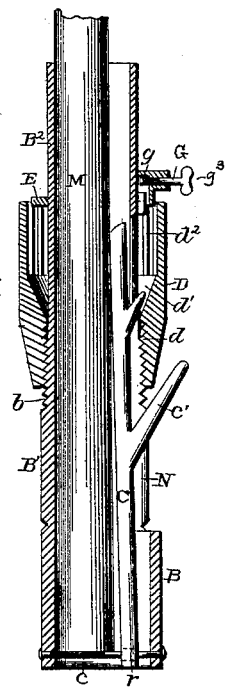

B is the lower part of the socket, the front of which extends somewhat beyond the central part B', as distinctly shown in Figs. 3 and 4. From front to back of the part B there extend two rods $c$, which pass through the lower end of a dog C, as shown in Figs. 3, 4, and 8, the openings in the dog through which the rods $c$ pass (shown by dotted lines $r$) being sufficiently large to permit the dog to vibrate forward and backward thereon as about a pivot or to slide backward and forward on them, so that when the upper part of the dog is pressed against a whip-handle the bottom may also be moved somewhat inward to lessen the angle at which said dog engages the whip and at the same time move about its point of connection with the rods as about a pivot. On the upper part of the dog, one above the other, are formed two prongs, which project through a slot N, cut through the front of the central and upper parts of the socket. The upper end of the central part B' is threaded externally, as shown at $b$, and above this extends the reduced upper end B².

D represents a sleeve, having an internally-threaded end adapted to engage the thread $b$, as shown at $d$. For a short distance above the threaded end the interior of the sleeve has the shape of an inverted frustum of a cone, as seen at $d'$. Above the part $d'$ the interior of the sleeve is cylindrical and provided with vertical ribs, which form a ratchet $d^2$, the periphery of the bottom of the sleeve being beveled to more readily engage the lower prong $c'$. The sleeve D encircles the socket above the prong $c'$, which is of such length and forms such an angle with the dog as always to be engaged on the inside by the lower end of said sleeve when it is screwed down on the socket, whereby the dog is drawn toward and partially into the slot N, thus leaving the bore of the socket unobstructed to receive the handle of a whip, as shown in Fig. 3. After the whip-handle M is inserted in the socket the sleeve is screwed up, bringing the sloping part $d'$ of the inner wall thereof into contact with the upper prong $c^2$, which is shorter than the prong $c'$ and so located on the dog as to be at all times within the sleeve. The contact of the sloping wall of the sleeve with prong $c^2$ forces the dog inward against the whip-handle and holds said whip firmly in the socket, as seen in Fig. 4.

Above the slot N the socket is encircled by a collar E of such diameter as to allow the sleeve D to embrace it as said sleeve is screwed upward. On one side of the collar there is formed a vertical wall having an outwardly-projecting horizontal rim, forming together a cap $e$. On the inside of the wall of the cap $e$ there is a recess $e'$, open on the bottom and the side toward the wall of the socket. Pivoted at $f$ on the under side of the collar E there is a pawl F, having a head $f'$ on one end which extends up into the recess $e'$ and has its outer vertical edge beveled. In its normal position the prong $f^2$ on the other end of the pawl extends outward, as shown in Figs. 5 and 6, and is actuated to engage the ratchet $d^2$ of the sleeve D by a spring H. (Shown in Fig. 6.) A revoluble rod G passes through an orifice in the horizontal part of the cap $e$ into the recess $e'$ and has a head $g$ on the inner end, which is located in said recess above the head $f'$ of the pawl F, the inner edge of the outer end of which is beveled, as shown at $g^2$, Fig. 7. On the outer end of the rod G there is a hand-hold $g^3$. The head $g$ is elongated and normally rests in a horizontal position in the recess in the same manner as shown in Fig. 7. When the sleeve D is to be screwed up, the head $g$ is turned downward, bringing its beveled edge into contact with the beveled face of the head $f'$ and forcing it toward the back of the recess $e'$, thus drawing the prong $f^2$ of the pawl back beneath the collar E, as shown by dotted lines R, Fig. 6. After the dog is forced against the whip-handle the head $g$ is turned back to its original position, when the spring H actuates the prong $f^2$ of the pawl to engage the ratchet in the sleeve D. The pawl is constructed to permit a continued upward movement of the sleeve after it. The pawl is in engagement with the ratchet, as is usual. To retract the said sleeve D, the head $g$ is again turned down and disengages the pawl from the ratchet.

Having thus described my invention, what I claim as new, and desire to secure by Letters Patent, is—

1. The combination, with a slotted whip-socket, of a dog pivoted in one end thereof, prongs on the dog projecting through said slot, a screw-thread formed externally in the socket above the lower prong, and a sleeve having an internal threaded lower portion adapted to engage the thread in the socket, and a sloping inner surface constructed to engage the upper prong on the dog, substantially as and for the purpose specified.

2. The combination, with a slotted whip-socket, of rods passing through the lower end thereof, a dog having a combined sliding and pivotal connection with said rods, prongs on the dog projecting through the slot in the socket, a screw-thread formed externally in the socket above the lower prong, and a sleeve having an internal threaded lower portion adapted to engage the thread in the socket, and a sloping inner surface constructed to engage the upper prong on the dog, substantially as and for the purpose specified.

3. The combination, with a slotted whip-socket, of a dog pivoted in one end thereof, prongs on the dog projecting through the slot in the socket, a screw-thread formed externally in the socket above the lower prong, a sleeve having an internal threaded lower portion adapted to engage the thread in the socket, a sloping inner surface constructed to engage the upper prong on the dog and a ratchet located above said sloping surface, and a pawl connected with the socket above the sleeve and adapted to engage the ratchet when the sleeve is in an elevated position, substantially as and for the purpose specified.

4. The combination, with a slotted whip-socket, a dog pivoted in an end thereof, and a sleeve having a screw connection with the socket and adapted to actuate the dog, of a collar located above the sleeve and having a cap $e$, provided with a recess in its inner face, a spring-actuated pawl pivoted to the collar and constructed to engage a ratchet in the sleeve, a head formed on an end of the pawl and engaging the recess in the cap, and a revoluble rod passing through the cap and having a head adapted to engage the head on the pawl, substantially as and for the purpose specified.

5. The combination, with a slotted whip-socket, a dog pivoted in an end thereof, a screw-thread formed externally in the socket between the prongs, a sleeve having an internal threaded portion adapted to engage the thread in the socket, a beveled bottom edge constructed to engage the lower prong on the dog, a sloping inner surface constructed to engage the upper prong, and a vertical toothed ratchet located therein above said sloping surface, of a collar located above the sleeve and having a cap $e$, provided with a recess in its inner face, a spring-actuated pawl pivoted to the collar and constructed to engage the ratchet in the sleeve, a head formed on an end of the pawl and engaging the recess in the cap, and a revoluble rod passing through the cap and having a head adapted to engage the head on the pawl, all constructed and operating substantially as and for the purpose specified.

HARRY WALTER JONES.

Witnesses:
 DAVID J. JONES,
 CYRUS LINGERFIELD.